UNITED STATES PATENT OFFICE.

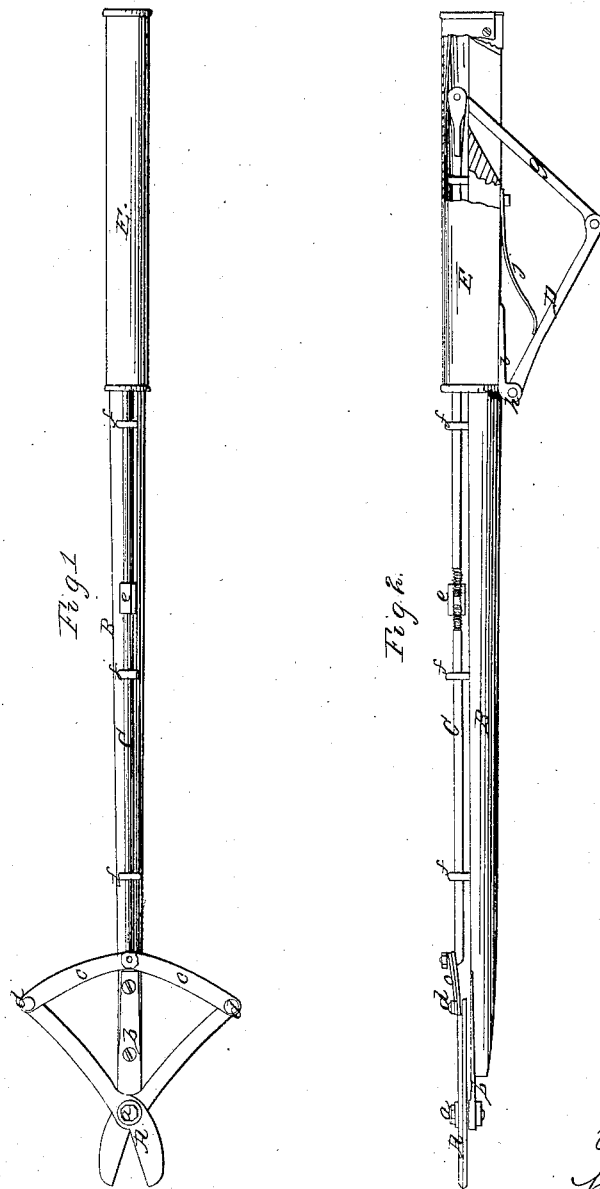

JOSEPH EVANS, OF SAN JOSE, CALIFORNIA.

PRUNING-SHEARS.

Specification of Letters Patent No. 32,827, dated July 16, 1861.

*To all whom it may concern:*

Be it known that I, JOSEPH EVANS, of San Jose, in the county of Santa Clara and State of California, have invented a new and useful Improvement in Pruning-Shears; and I do hereby declare that the following is a full, clear, and exact description of the same, reference being had to the accompanying drawing, forming a part of this specification, in which—

Figure 1, represents a front elevation of my invention. Fig. 2, is a side elevation of the same.

Similar letters of reference in both views indicate corresponding parts.

The object of this invention is to construct shears adapted for pruning trees out of the ordinary reach of the arm, and capable of being operated while both hands can be used for steadying the pole to which the shears are attached. In order to render the operation of such shears practicable, those parts, which serve to operate the same, must be so arranged, that the pole remains perfectly steady while the shears open or close. If the shears are operated by pulling a cord or rod in the direction of the pole, that hand, which is engaged in exerting a strain on said cord or pole, can not, at the same time be used for steadying the pole, and it is impossible, with one hand, to manage the shears and to keep them to the point where they are intended to do service, especially if the pole is of considerable length. And if both hands have to be used to operate the shears no man is able to keep them sufficiently steady to render them in any way practicable. For these reasons I have arranged my shears in such a manner that the same can be operated by a simple pressure of the thumb or palm of one hand, while both hands are employed for the purpose of steadying the pole, and I will now proceed to describe the means, which I employ to obtain this object and which I consider as my invention, with reference to the drawing.

The shears A, are secured to the end of the pole B, by means of a pivot $a$, passing through a bracket $b$, that is firmly attached to the pole. The pivot $a$, forms also the fulcrum for the two arms of the shears and these two arms are curved outwardly as clearly shown in Fig. 1, and they are connected by means of links $c$. The outer ends of these links are attached to the arms of the shears by means of pivots $d$, and their inner ends are hooked on the end of the rod C, so that by pulling this rod down the shears are closed and by pushing the same up, the shears are opened. The rod C, is made out of two parts, which are united by a screw coupling $e$, with a right and left handed thread, whereby the length of the rod can be adjusted and the throw of the shears increased or diminished at pleasure. The rod C, is guided by loops or eyes $f$, that are firmly inserted into the pole B, and its lower end connects, by means of a link $g$, with the trigger D. This trigger is secured to the side of the pole B, opposite to the rod C, by means of a pivot $h$, passing through a bracket $i$, and a spring $j$, forces said trigger off from the pole as far as the link $g$, will allow. The lower end of the pole is protected by a case E, which incloses the end of the rod C, and which forms the handle for the pole, and the guide for the joint between the link and the rod.

If it is desired to use the shears, the four fingers of the right hand are placed around the case E, with the thumb ready to operate the trigger, while the left hand takes hold of the pole above the case. The shears are now brought to the desired position and by depressing the trigger they are closed. On releasing the trigger the spring $j$ forces the same up to its original position and the shears are ready for a new cut.

These shears are very simple, they are easily operated and the pole can be made of any desired length and still the shears can be operated with comparative ease, since both hands can be employed for steadying the pole and a small motion of a portion of one hand is sufficient to depress the trigger and to effect the cutting.

Having thus fully described my invention what I claim as new and desire to secure by Letters Patent is:

The arrangement of the trigger D, and the adjustable rod C, in combination with the shears A, and pole B, constructed and operating in the manner and for the purpose set forth.

JOSEPH EVANS.

Witnesses:
M. M. LIVINGSTON,
C. W. COWTAN.